(12) United States Patent
Hayek

(10) Patent No.: US 6,182,658 B1
(45) Date of Patent: Feb. 6, 2001

(54) FLUID CONTROL VALVES

(76) Inventor: Zamir Hayek, 10 Downage, London NW4 1AA (GB)

( * ) Notice: Under 35 U.S.C. 154(b), the term of this patent shall be extended for 0 days.

(21) Appl. No.: 09/068,040

(22) PCT Filed: Oct. 30, 1996

(86) PCT No.: PCT/GB96/02647

§ 371 Date: Aug. 3, 1998

§ 102(e) Date: Aug. 3, 1998

(87) PCT Pub. No.: WO97/16663

PCT Pub. Date: May 9, 1997

(30) Foreign Application Priority Data

Oct. 31, 1995 (GB) .................................................. 9522222

(51) Int. Cl.[7] .................................................. A62B 9/02
(52) U.S. Cl. .............................. 128/205.24; 128/205.19; 601/43
(58) Field of Search ........................ 128/205.24, 205.19; 604/32, 248; 601/41, 43

(56) References Cited

U.S. PATENT DOCUMENTS

| | | | |
|---|---|---|---|
| 2,914,064 | * 11/1959 | Sandelowsky | 128/205.19 |
| 4,646,733 | * 3/1987 | Stroh et al. | 128/205.24 |
| 5,233,974 | 8/1993 | Senoue et al. | |
| 5,771,928 | * 6/1998 | Zepic et al. | 137/625.22 |
| 5,850,835 | * 12/1998 | Takaki et al. | 128/205.24 |
| 5,988,166 | * 11/1999 | Hayek | 128/205.24 |

FOREIGN PATENT DOCUMENTS

| | | |
|---|---|---|
| 2273740 | 1/1976 | (EP) . |
| 0066669 | 2/1982 | (EP) . |
| 0373153 | 6/1990 | (EP) . |
| 2020399 | 11/1979 | (GB) . |
| 2152201 | 7/1985 | (GB) . |
| 2215218 | 9/1989 | (GB) . |
| 2241770 | 9/1991 | (GB) . |
| WO94/27553 | 12/1994 | (WO) . |

* cited by examiner

*Primary Examiner*—John Mulcahy
*Assistant Examiner*—Victor K. Hwang
(74) *Attorney, Agent, or Firm*—Allston L. Jones

(57) ABSTRACT

A fluid control valve for connection between a positive fluid pressure source, a negative fluid pressure source and a device to be connected alternately to the pressure sources, comprising a body having ports for connection to the fluid pressure sources and the device, and a rotary member rotatable with respect to the body and adapted selectively to interconnect the ports, whereby the rotary member is operable on rotation in a single sense to connect alternately the positive fluid pressure source and the negative fluid pressure source to the device.

8 Claims, 4 Drawing Sheets

FLUID CONTROL VALVES

The present invention relates to fluid control valves, especially for use in controlling fluid flow to ventilator or physiotherapy apparatus.

EP-A-0373153 discloses a ventilator apparatus for use in the ventilation of the lungs of a patient, which apparatus comprises a ventilator enclosure, for receiving the chest region of a patient's body, connected via a fluid control valve both to a positive pressure source and a negative pressure source. The fluid control valve comprises a main port connected to the ventilator enclosure, subsidiary ports connected to a respective one of the positive and negative pressure sources, and a shutter mechanism which alternately permits the application of positive and negative pressure to the ventilator enclosure. With this arrangement the use of separate positive and negative pressure sources, such as a pair of gas blowers, is required. Ideally, for efficiency the use of a single gas blower is however desired. The arrangement disclosed in EP-A-0373153 does not allow for the use of a single gas blower having its positive pressure side connected to one subsidiary port of the fluid control valve and its negative pressure side connected to the other subsidiary port of the fluid control valve since a closed loop would be created with no vent to the exterior of the valve.

WO-94/27553 discloses a fluid control valve which allows the positive and negative pressure sides of a single fluid supply to be connected to a closed system, such as a ventilator enclosure, so as to permit the generation alternately of a positive and negative pressure in the closed system. The fluid control valve comprises a valve body having first and second subsidiary ports for connection to the ventilator enclosure, and a valve means which comprises a shutter mechanism for selectively connecting either the first subsidiary port to the main port whilst blocking the connection path between the second subsidiary port and the main port, or connecting the second subsidiary port to the main port whilst blocking the path between the first subsidiary port and the main port. In order to permit connection to a closed system, the valve means includes a further shutter mechanism which is coupled for synchronous movement with the first-mentioned shutter mechanism so as to provide a temporary connection to the exterior of the valve from whichever of the first and second subsidiary ports is blocked off from the main port. Such an arrangement allows the use of a single fluid supply, and by the use of a shutter mechanism which is capable of progressively closing the path between the main port and the respective subsidiary port, greater control over the shape and intensity of the positive and negative Pressure pulses applied to the main port is provided. However, the arrangement cannot provide a supply of positive and negative fluid pressure at frequencies exceeding 5–6 Hz. The reason for this is that to generate alternately a positive and negative pressure at the main port requires the repeated reversal of the direction of rotation of the shutter mechanism and the frequency of operation of that control valve is limited to the rate at which the direction of rotation of the control motor and hence shutter mechanism can be reversed. Reversal of the direction of rotation of the control motor requires the motor to be brought to stop which introduces an unavoidable minimum time delay.

A fluid control valve has been devised which provides an alternate positive and negative pressure source at an outlet, which uses a single fluid supply and which is capable of operation at high frequencies. Instead of requiring a shutter mechanism which is reversed to provide alternately a positive and negative pressure source at the outlet, the present invention employs a rotary valve member which is continuously rotated in a single sense.

Continuous rotation of the shutter mechanisms employed in the fluid control valve disclosed in WO-94/27553 is not possible since, over a sector of the rotation of the shutter mechanisms, both of the subsidiary ports which are connected to the blower inlet and the blower outlet would at the same time be connected to the main port.

Accordingly, the present invention provides a fluid control valve for connection between a positive fluid pressure source, a negative fluid pressure source and a device to be connected alternately to said pressure sources, comprising a body having ports for connection to said fluid pressure sources and said device, and a rotary member rotatable with respect to said body and adapted selectively to interconnect said ports, whereby said rotary member is operable on rotation in a single sense to connect alternately said positive fluid pressure source and said negative fluid pressure source to said device. Preferably, the fluid control further comprises a port for providing a vent to atmosphere. With this fluid valve, a supply of positive and negative pressure at frequencies exceeding 10 Hz can be provided.

In a preferred embodiment said body comprises a first port for connection to said device, a second port for connection to said positive fluid pressure source, a third port for connection to said negative fluid pressure source and a fourth port for providing a vent to the exterior of said body, and said rotary member is disposed within said body, said rotary member being adapted on rotation selectively to connect said second port to said first port and said third port to said fourth port whilst blocking off connection between said second port and said fourth port and said third port and said first port, and also to connect said third port to said first port and said second port to said fourth port whilst blocking off connection between said second port and said first port and said third port and said fourth port.

The present invention also extends to a ventilator or physiotherapy apparatus for use in the ventilation of the lungs of a patient, comprising an enclosure for receiving at least the chest region of the patients' body, and a means for altering the pressure in the enclosure to produce ventilation, said means comprising a positive fluid pressure source, a negative fluid pressure source and the above-described fluid control valve connected between said sources and said enclosure.

A preferred embodiment of the present invention will now be described by way of example only with reference to the accompanying drawings, in which.

Figure 1:
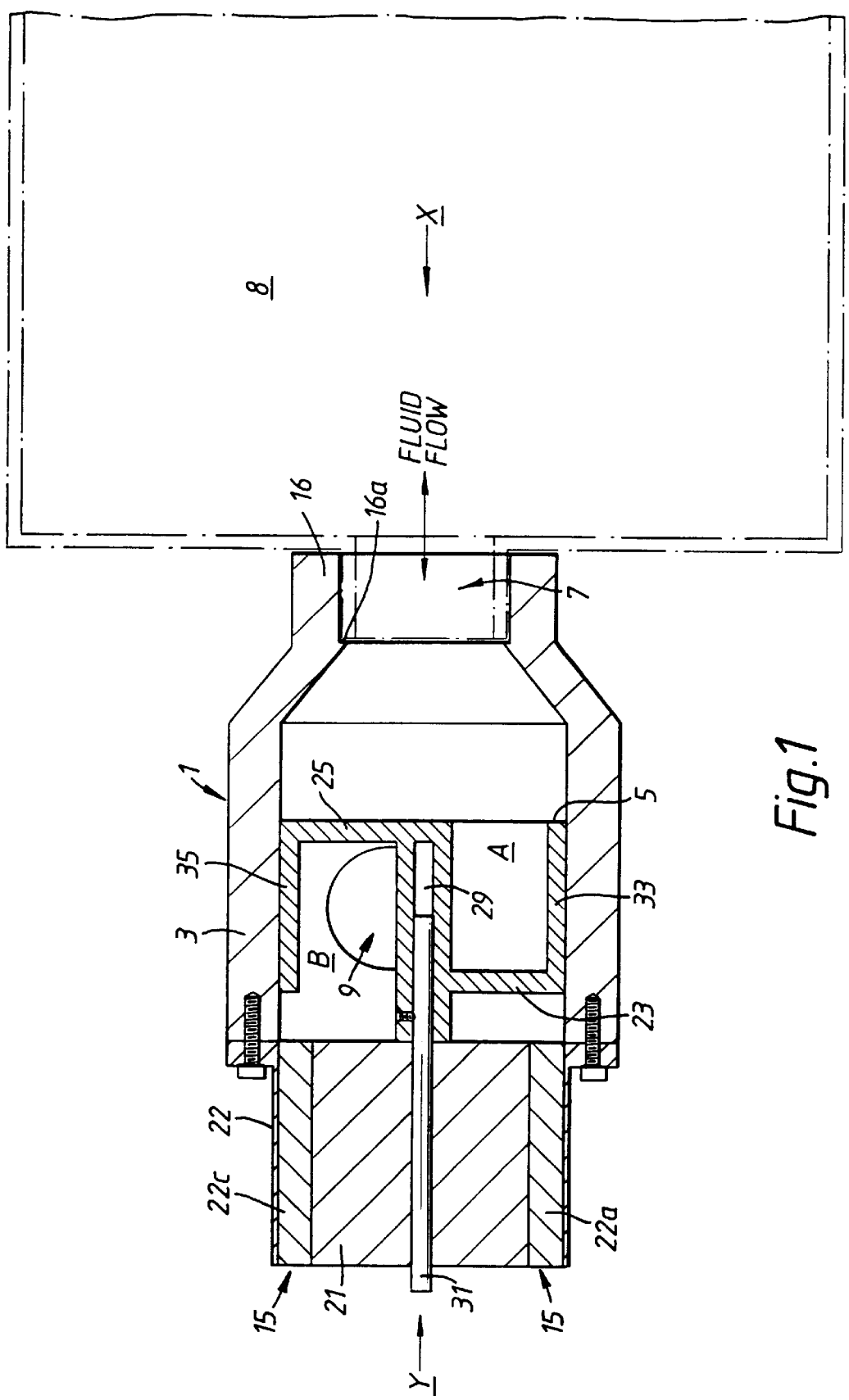
FIG. 1 illustrates a cross-sectional view along the longitudinal axis of a fluid control valve in accordance with an embodiment of the present invention, shown coupled to a control motor and a ventilator enclosure.
Figure 2:
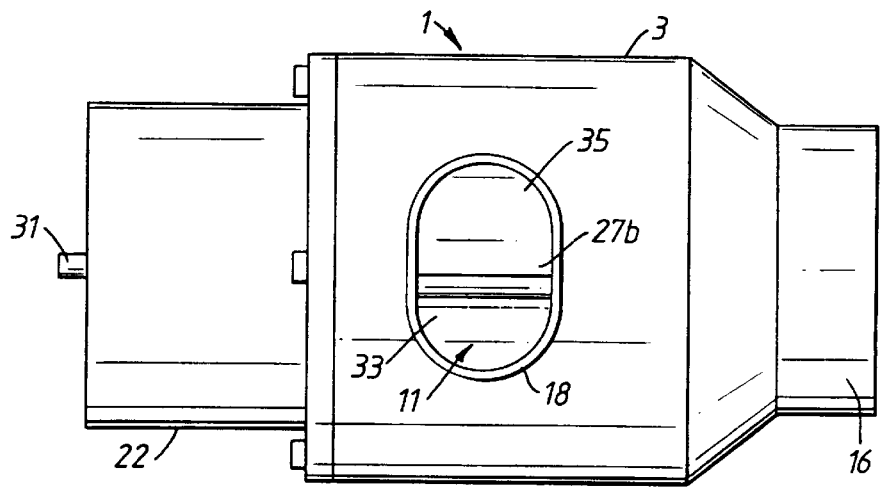
FIG. 2 illustrates a side view of the valve and control motor as shown in FIG. 1 (the view from the other side being a mirror image)

A valve 1 in accordance with the present invention comprises a main body 3, which is tubular, and a rotary valve member 5 disposed therewithin.

The main body 3 has a first (main) port 7 for connection to a ventilator enclosure 8, second and third ports 9,11 respectively providing connection paths between the inlet and outlet of a blower 12 and the interior of the main body 3, and a fourth port 15 for communication with the exterior of the valve 1. The main port 7 is connected to the ventilator enclosure 8 by a first conduit 16 and the second and third ports 9,11 are connected to the inlet and outlet of the blower 12 via second and third conduits 17,18. The first conduit 16 is provided with a flange 16a at its inwardmost edge so as to provide means for accurately locating therein the connection tubing to the ventilator enclosure 8. A motor 21, for example a stepper or servo motor, is connected to the valve member 5 so as to control the operation of the valve 1. This will be described in more detail hereinbelow. In use, by operation of the motor 21, the main port 7 of the valve 1 is connected in alternate succession to the inlet and the outlet of the blower 12.

Figure 3:
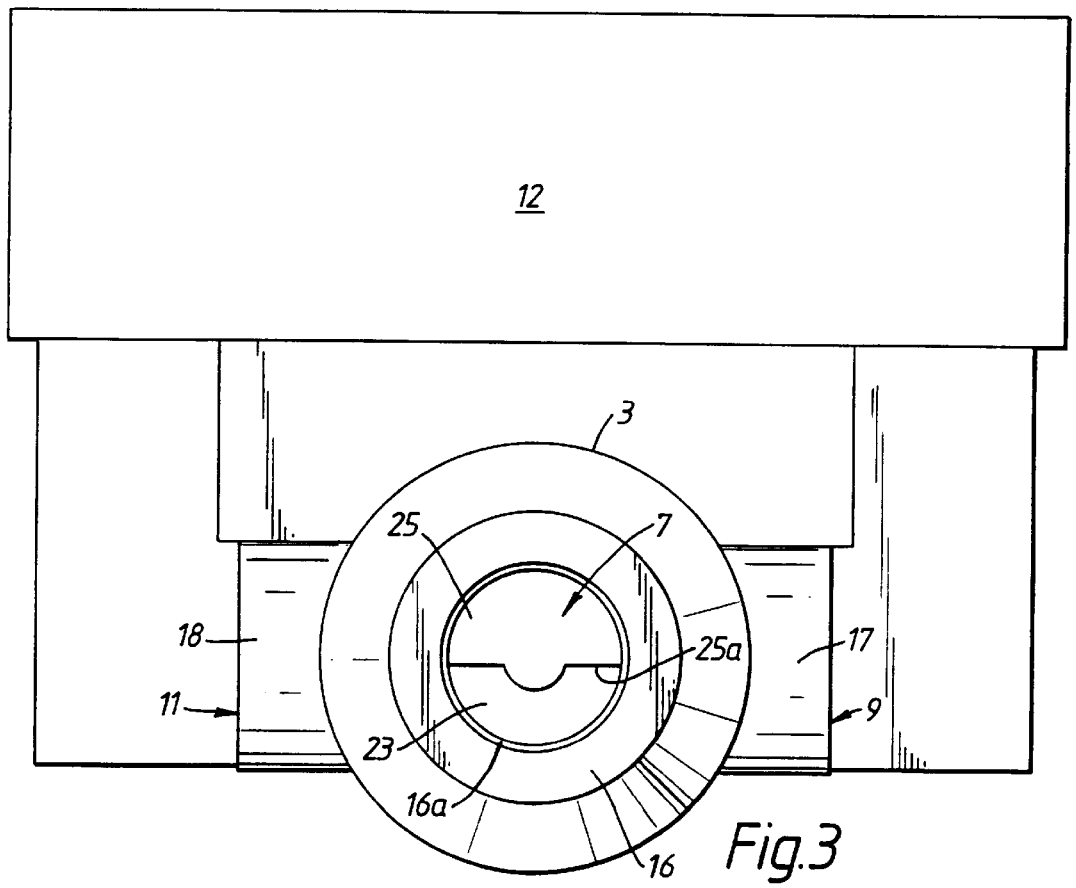
FIG. 3 illustrates a view along direction X of one end of the valve and control motor illustrated in FIG. 1, shown coupled to a blower.
Figure 4:
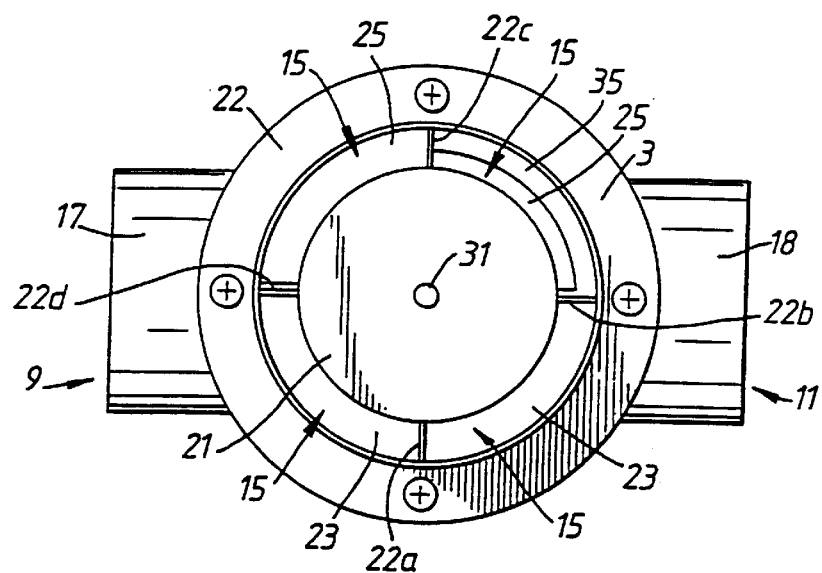
FIG. 4 illustrates a view along direction Y of the other end of the valve and control motor illustrated in FIG. 1.
Figure 5:
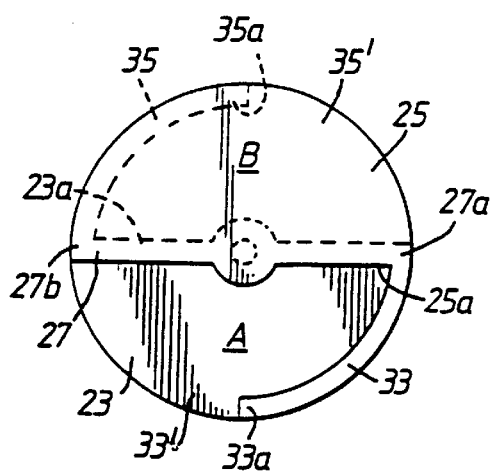
FIG. 5 illustrates a view along direction X of one end of the rotary valve member of the valve illustrated in FIG. 1.
Figure 6:
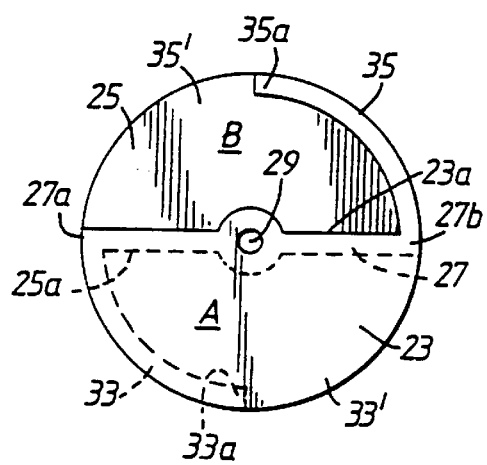
FIG. 6 illustrates a view along direction Y of the other end of the rotary valve member of the valve illustrated in FIG. 1.
Figure 7A:
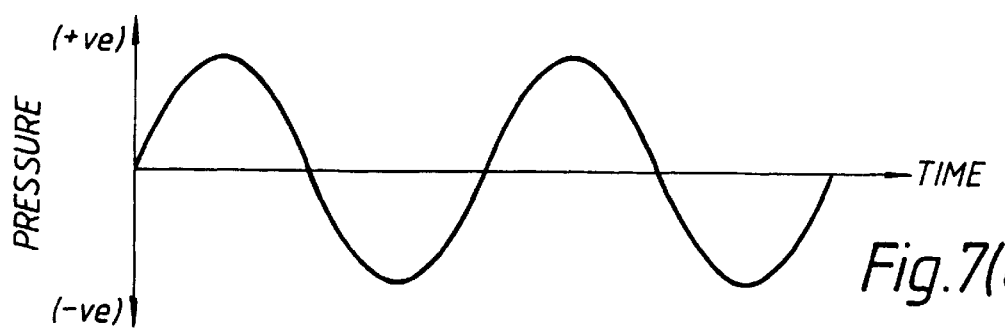
FIGS. 7(a–d) illustrate examples of the pressure pulse waveforms which can be achieved by the fluid valve of the present invention.
Figure 7B:
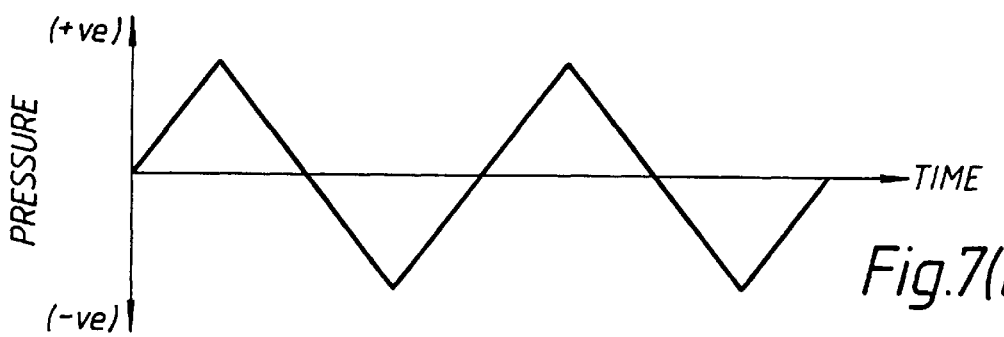
Figure 7C:
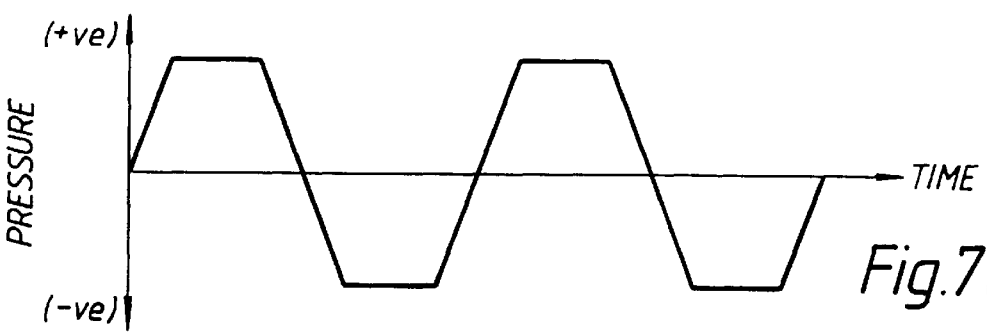
Figure 7D:
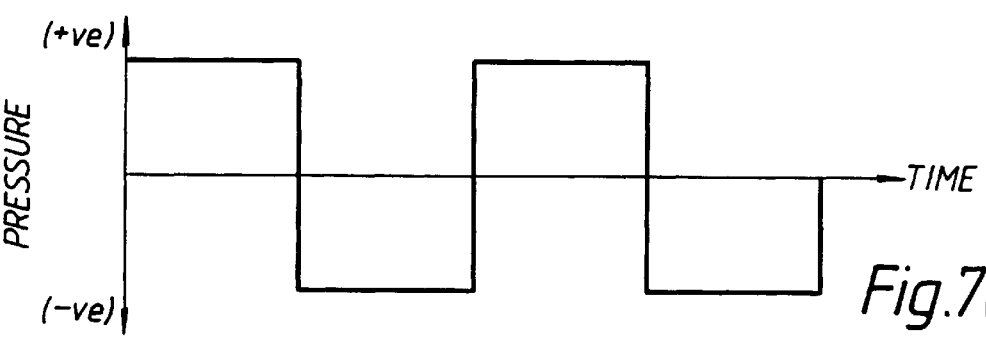

As shown in FIGS. 3 and 4, the second and third ports 9,11 are located at positions spaced 180° apart on the circumference of the main body 3. The second and third ports 9,11 each comprise a rectangular opening having semi-circular ends. Each opening extends about the circumference of the main body 3 a distance equal to about one-quarter of the entire circumference of the main body 3 The width of the second and third ports 9,11 corresponds substantially, but is no greater than, the height of the valve member 5.

The valve member 5 is an essentially cylindrical body, the outer periphery of which is in sealing engagement with the inner surface of the main body 3. The periphery of the valve member 5 is not required to be an airtight fit with the inner surface of the main body 3. It is sufficient that the seal between the valve member 5 and the main body 3 be such that any leakage is sufficiently low that the valve member 5 can operate properly to provide alternately a positive and negative pressure at the main port 7.

The valve member 5 comprises first and second substantially semi-circular end wall portions 23,25, the diameters 23a,25a of which are joined by a rectangular connecting member 27 which is arranged perpendicular to the major surfaces of the end wall portions 23,25. The mid-point of the long dimension of the connecting member 27, which long dimension corresponds to the inner diameter of the main body 3, includes a part defining an opening 29 for receiving the distal end of the shaft 31 of the control motor 21. In this embodiment the valve member 5 is a moulded article and the opening 29 is formed as an integral part thereof. The valve member 5 further comprises first and second sidewall portions 33,35 which extend from the ends 27a,27b of the rectangular connecting member 27 about the respective outer peripheral edges of the respective endwall portions 23,25 a distance corresponding to one quadrant of the circle defined by the first and second endwall portions 23,25. First and second sidewall apertures 33',35' are defined between the free ends 33a,35a of the first and second sidewall portions 33,35 and the respective end 27b,27a of the connecting member 27. The first and second sidewall apertures 33',35' open respectively to first and second chambers A,B in the valve member 5. The height of the sidewall portions 33,35 corresponds to the width of the rectangular connecting member 27.

The control motor 21 is supported in a housing 22 by four support webs 22a–d. The outer diameter of the casing of the motor 21 is smaller than the inner diameter of the housing 22, and the circumferential space between the casing of the motor 21 and the housing 22 defines the fourth port 15. Alternatively, the fourth port 15 can be provided by an opening or openings defined in any part of the sidewall of the main body 3 on that side of the valve member 5 opposed to the main port 7 (i.e. the left-hand side in FIG. 1).

In use, the valve member 5 of the fluid control valve continuously rotates in a single sense, in either a clockwise or anti-clockwise direction when viewed along direction X in FIG. 1. Operation of the valve over one revolution is as follows.

Starting from the position in which the first and second sidewall portions 33,35 of the valve member 5 respectively totally encompass and hence close the third and second subsidiary ports 11,9 of the valve 1, the control motor 21 is operated to rotate the valve member 5 in a clockwise direction when viewed along direction X as shown in FIG. 1. The first and second sidewall portions 33,35 of the valve member 5 are thus moved such that the first and second sidewall apertures 33',35', which open to the first and second chambers A,B of the valve member 5, are respectively progressively opened to the second and third ports 9,11 of the valve 1. When the valve member 5 has rotated through a one-quarter turn from its original starting position, the first and second sidewall apertures 33',35' correspond exactly with the second and third ports 9,11 respectively and the second and third ports 9,11 are respectively fully open to the first and second chambers A,B in the valve member 5. In this position the second port 9 is in communication with the main port 7, with communication between the second port 9 and the fourth port 15 being blocked off by the first endwall portion 23 of the valve member 5, and the third port 11 is in communication with the fourth port 15, with communication between the third port 11 and the main port 7 being blocked off by the second endwall portion 25 of the valve member 5. Thereby, the outlet of the blower 12 (the positive pressure side) which is connected to the second port 9 is in communication with the main port 7 and the inlet of the blower 12 (the negative pressure side) which is connected to the third port 11 is vented to the exterior of the valve 1 through the fourth port 15.

The valve member 5 continues to rotate in the same direction such that the first and second sidewall portions 33,35 of the valve member 5 progressively close the second and third ports 9,11 respectively. When the valve member 5 has rotated through a half-turn from its original starting position, the first and second sidewall portions 33,35 correspond exactly with the second and third ports 9,11 respectively, in which position the second and third ports 9,11 are fully closed.

The valve member 5 continues to rotate in the same direction such that the first and second sidewall apertures 33',35', which open to the first and second chambers A,B of the valve member 5, respectively progressively open the third and second ports 11,9 of the valve 1. When the valve member 5 has rotated through a three-quarter turn from its original starting position the first and second sidewall apertures 33',35' correspond exactly with the third and second ports 11,9 respectively and the second and third ports 9,11 are fully open to the second and first chambers B,A of the valve member 5. In this position the second port 9 is in communication with the fourth port 15, with communication between the second port 9 and the main port 7 being blocked off by the second endwall portion 25 of the valve member 5, and the third port 11 is in communication with the main port 7, with communication between the third port 11 and the fourth port 15 being blocked off by the first endwall portion 23 of the valve member 5. Thereby, the inlet of the blower 12 (the negative pressure side) which is connected to the third port 11 is in communication with the main port 7 and the outlet of the blower 12 (the positive pressure side) which is connected to the second port 9 is vented to the exterior of the valve 1 by the fourth port 15.

The valve member 5 continues to rotate in the same direction such that the first and second sidewall portions 33,35 of the valve member 5 progressively close the third and second ports 11,9 respectively. When the valve member 5 has rotated through one full turn from its original starting position, i.e. has completed one revolution, the first and second sidewall portions 33,35 correspond exactly with the third and second ports 11,9 respectively.

In each revolution of the valve member 5 the main port 7, which is coupled to the ventilator enclosure 8, communicates once with the positive pressure side and once with the negative pressure side of the blower 12. Thereby, as the valve member 5 is continuously rotated a positive and negative pressure is alternately generated at the main port 7. Typically, in the operation of the valve, the time taken for the valve member 5 to rotate from the starting position to the one-quarter turn position (the positive pressure cycle) may be set to be only half that of the time taken for the valve member 5 to rotate from the half-turn to three-quarter turn position (the negative pressure cycle), in which case the duty cycle would be 1:2.

The duty cycle of the fluid valve, which is the time that the main port 7 is connected to the positive pressure source in relation to the time that the main port 7 is connected to the negative pressure source, corresponds to the Inspiration/Expiration (I/E) ratio. In use, the duty cycle employed may be between 10:1 and 1:10. A duty cycle of 10:1 is typically used in physiotherapy, where such an I/E ratio imitates the coughing action. A duty cycle of 1:3 is typically used in ventilating the lungs of a person suffering from asthma, where a slow and controlled expiration is required.

The fluid control valve of the present invention also permits the shape of the waveform of the pressure pulses applied to the main port 7 to be altered. The shape is a function of the speed of rotation of the valve member 5 during the phases of the rotation of the valve member 5 corresponding to the positive and negative pressure cycles, and the pressure developed by the blower 12. Examples of the shapes of the pressure pulse waveforms which can be achieved by the fluid valve of the present invention are sinusoidal, saw-tooth, trapezoidal and square/rectangular. FIG. 7(*a*) illustrates a sinusoidal waveform, which waveform can be achieved by operation of the fluid valve at a duty cycle of 1:1, with the valve member 5 operated at a fixed continuous speed. FIG. 7(*b*) illustrates a saw-tooth waveform, which waveform can be achieved by operation of the fluid valve at a 1:1 duty cycle, with the speed of rotation of the valve member 5 during the positive and negative pressure cycles being relatively high and with the speed of rotation of the valve member 5 between the positive and negative cycles being at a maximum in order to eliminate dwell time between the positive and negative transitions. FIG. 7(*c*) illustrates a trapezoidal waveform, which waveform can be achieved by operation of the fluid valve at a duty cycle of 1:1, with the speed of rotation of the valve member 5 being controlled such that during the initial phase of the opening of the valve member 5 in the positive and negative pressure cycles the speed of rotation of the valve member 5 is kept high and thereafter during the latter phase of the positive and negative pressure cycles the speed of rotation of the valve member 5 is slowed in order to provide a period of constant pressure at the main port 7. FIG. 7(*d*) illustrates a square waveform, which waveform can be achieved by operation of the fluid valve in the manner described above for achieving a trapezoidal waveform, except that the blower 12 is configured to develop a higher pressure than is actually required, that is an over-pressure, whereby the over-pressure provides for an instantaneous increase/decrease in pressure to the desired maximum/minimum level in order to provide for the sharp transition edges of the square pulses. It will of course be understood by a person skilled in the art that the above-described waveforms could be achieved by duty cycles other than 1:1 by selectively controlling the pressure developed by the blower 12.

The fluid valve of the present invention can further be used to provide an oscillating pressure pulse waveform in an entirely positive or negative pressure regime. This can be achieved by connecting one of a further positive or negative pressure source to the ventilator apparatus and operating the fluid valve as described above to produce the various waveforms. Alternatively, this can be achieved by alteration of the duty cycle. If the ventilator apparatus is to be operated entirely in a positive pressure regime the ratio of the time in which the positive pressure source is connected to the main port 7 in relation to the time in which the negative pressure source is connected to the main port 7 would be increased, and vice versa for operation entirely in a negative pressure regime.

The fluid valve of the present invention yet further provides for operation in either a continuous positive or negative pressure mode. This is achieved by positioning the valve member 5 in the above-described one-quarter or three-quarter turn position whereby the main port 7 communicates with the respective one of the inlet of outlet of the gas blower 12. Moreover, if necessary, the fluid valve can be operated in an oscillating mode, wherein the direction of the valve member 5 is continually reversed to provide connection to the positive and negative pressure sources in the manner of the known prior art.

It will be understood that the valve of the present invention can find application not only in providing an alternate positive and negative pressure source to a ventilator apparatus, but can be employed in many other applications, such as in a resuscitation or physiotherapy apparatus where an alternate positive and negative pressure source is required, or in the transport of sheet materials where sheets are repeatedly removed from a stack using a vacuum.

What is claimed is:

1. The combination of a fluid control valve and a blower having an inlet and an outlet, the valve being connected between the blower outlet and the blower inlet and the valve comprising a body and a rotary member, the body having a first port, a second port connected to the blower outlet, a third port connected to the blower inlet and a fourth port for providing a vent to atmosphere and the rotary member being rotatable about an axis with respect to the body and adapted selectively to connect said ports, wherein the axis extends from the fourth port whereby the rotary member is operable on rotation in a single sense to connect in a first position the second port to the first port and the third port to the fourth port and to connect in a second position, the third port to the first port and the second port to the fourth port and whereby the rotary member has a third position in which it closes the second and third ports, the third position being intermediate the first and second positions.

2. The combination as claimed in claim 1, wherein over one revolution of the rotary member, the blower outlet and the blower inlet are alternately connected to the first port.

3. The combination as claimed in claim 1, further comprising means for controlling the speed of rotation of the rotary member so as to after the shape, duration and/or frequency of positive and negative pressure pulses provided by the valve.

4. The combination as claimed in claim 1, where in the rotary member is disposed within the body, the rotary member being adapted on rotation to selectively connect the second port to the first port and the third port to the fourth port whilst blocking off connection between the second port and the fourth port and the third port and the first port, and also to connect the third port to the first port and the second port to the fourth port whilst blocking off connection between the second port and the first part and the third port and the fourth port.

5. The combination as claimed in claim 4, Wherein the rotary member is a substantially cylindrical body, the outer periphery of which is in sealing engagement with the inner surface of the valve body, and the rotary member comprises first and second spaced apart endwall portions which are coupled by a connecting member and first and second sidewall portions which extend from the opposed ends of the connecting member part way about the outer peripheral edges of the respective endwall portions thereby defining first and second sidewall apertures between the free ends of the fist and second sidewall portions and the respective other ends of the connecting member, whereby when the first and second sidewall apertures open to the second and third ports respectively the second port is in communication with the first port, the third port is in communication with the fourth port and communication between the second port and the fourth port and the third port and the first port is blocked off by the first and second endwall portions respectively, and when the first and second sidewall apertures open to the third and second ports respectively the second port is in communication with the fourth port, the third port is in communication with the first port and communication between the second port and the main port and the third port and the fourth part is blocked off by the second and first endwall portions respectively.

6. The combination as claimed in claim 1, further comprising a stepper or servo motor, wherein said motor is coupled to said rotary member and provides for rotation of the rotary member.

7. A ventilator apparatus for use in the ventilation of the lungs of a patient, comprising an enclosure for receiving at least the chest region of the patient's body, and a means for altering the pressure in the enclosure to produce ventilation, said means comprising the combination of a fluid control valve and blower having an inlet and an outlet, the valve being connected between the blower outlet and the blower inlet, and the valve comprising a body and a rotary member, the body having a first port, a second port connected to the blower outlet, a third port connected to the blower inlet and a fourth port for providing a vent to atmosphere and the rotary member being rotatable about an axis with respect to the body and adapted selectively to connect said parts, wherein the axis extends from the fourth port whereby the rotary member is operable on rotation in a single sense to connect in a first position the second port, to the first port and the third port to the fourth port and to connect in a second position, the third port to the first port, and the second port to the fourth port and whereby the rotary member has a third position in which it closes the second and third ports, the third position being intermediate the first and second positions; wherein the first port is coupled to the enclosure.

8. A physiotherapy apparatus for use in the ventilation of the lungs of a patient, comprising an enclosure for receiving at least the chest region of the patient's body, and a means for altering the pressure in the enclosure to produce ventilation, said means comprising the combination of a fluid control valve and blower having an inlet and an outlet, the valve being connected between the blower outlet and the blower inlet, and the valve comprising a body and a rotary member, the body having a first port, a second port connected to the blower outlet, a third port connected to the blower inlet and a fourth port for providing a vent to atmosphere and the rotary member being rotatable about an axis with respect to the body and adapted selectively to connect said ports, wherein the axis extends from the fourth port whereby the rotary member is operable on rotation in a single sense to connect in a first position the second port to the first port and the third port to the fourth port and to connect in a second position, the third port to the first port, and the second port to the fourth port and whereby the rotary member has a third position in which it closes the second and third ports, the third position being intermediate the first and second positions; wherein the first port is coupled to the enclosure.

* * * * *